United States Patent
Camacho Cardenas

(10) Patent No.: US 10,769,323 B2
(45) Date of Patent: Sep. 8, 2020

(54) RIG SYSTEMS SELF DIAGNOSTICS

(71) Applicant: Schlumberger Technology Corporation, Sugar Land, TX (US)

(72) Inventor: Alejandro Camacho Cardenas, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 368 days.

(21) Appl. No.: 15/645,762

(22) Filed: Jul. 10, 2017

(65) Prior Publication Data

US 2019/0012411 A1 Jan. 10, 2019

(51) Int. Cl.
- G06F 30/20 (2020.01)
- G05B 23/02 (2006.01)
- G06F 111/20 (2020.01)
- E21B 44/00 (2006.01)

(52) U.S. Cl.
CPC .............. *G06F 30/20* (2020.01); *E21B 44/00* (2013.01); *G05B 23/0283* (2013.01); *G06F 2111/20* (2020.01)

(58) Field of Classification Search
CPC .. G06F 17/5009; G05B 23/0283; E21B 44/00
See application file for complete search history.

(56) References Cited

U.S. PATENT DOCUMENTS

| | | | |
|---|---|---|---|
| 2004/0221985 A1 | 11/2004 | Hill et al. | |
| 2005/0222772 A1* | 10/2005 | Koederitz | E21B 21/10 702/6 |
| 2010/0042327 A1* | 2/2010 | Garvey | E21B 47/00 702/11 |
| 2010/0259415 A1* | 10/2010 | Strachan | G05B 13/048 340/853.6 |
| 2012/0197527 A1* | 8/2012 | McKay | E21B 41/0007 702/6 |
| 2014/0121973 A1* | 5/2014 | Buchanan | G01M 5/0033 702/6 |
| 2015/0095100 A1* | 4/2015 | Vittal | G05B 23/0213 705/7.28 |
| 2015/0107901 A1* | 4/2015 | Eriksson | E21B 47/12 175/40 |
| 2015/0160098 A1* | 6/2015 | Noda | G05B 23/024 702/35 |
| 2015/0198944 A1* | 7/2015 | Han | G05B 23/0283 700/121 |
| 2016/0140263 A1* | 5/2016 | Rojas | G05B 23/02 703/18 |
| 2017/0010382 A1 | 1/2017 | Mishkhes et al. | |
| 2017/0175516 A1 | 6/2017 | Eslinger | |

FOREIGN PATENT DOCUMENTS

WO 2016153895 A1 9/2016

* cited by examiner

*Primary Examiner* — Stephanie E Bloss
(74) *Attorney, Agent, or Firm* — Rachel E. Greene

(57) ABSTRACT

Systems and methods for calculating a standardized Health Index for a plurality of different components are shown and described. There is a vast number of different components used on an oil rig and each one may have a different definition of new, worn, damaged, or depleted. The system includes a measurement component that takes a measurement of the different components, and a health modeling component which calculates the standardized Health Index. Monitoring the Health Indices provides a rig operator information from which decisions on equipment use can be made.

26 Claims, 8 Drawing Sheets

RIG SYSTEMS SELF DIAGNOSTICS

BACKGROUND

Drilling rigs typically consist of a multitude of different pieces of equipment. In addition to the natural wear and tear that all equipment experiences, the relatively harsh environment in which drilling rigs causes some equipment to fail. Different equipment, however, fails at different rates and in different ways. There are currently limited ways to understand the current and predicted operational status of the various pieces of equipment used on a drilling rig. Given the broad spectrum of different operational activities & routines, sub-system interactions, manufacturers, and the sheer number of variables involved in drilling rigs, the number of possible operational states for a rig are vastly numerous. As such it is quite difficult to derive health correlations based on monitoring operational conditions alone. There is a need for systems and methods to circumvent this variability and to provide understanding across different pieces of equipment, technologies, and manufacturers.

SUMMARY

Various features of the present disclosure are described herein with reference to the Figures. Certain embodiments of the present disclosure are directed to a system for deriving a numerical Health Index for one or more components. The system includes a first component having a first feature which decays when the first component is operated and a second component having a second feature which decays when the second component is operated. The second component is different from the first component and may have different characteristics to be measured to determine its health. The system also includes a measurement component operably coupled to the component and configured to measure the decay of at least one of the first feature or the second feature, and a health modeling component configured to receive a measurement from the measurement component. The measurement represents the decay of at least one of the first feature and the second feature. The health modeling component is able to compute a first Health Index corresponding to the first component and a second Health Index corresponding to the second component. The first and second Health Indices are on a comparable scale.

Other embodiments of the present disclosure are directed to a method of monitoring a health of one or more components. The method includes taking a first measurement of a feature of a first component and taking a second measurement of a feature of a second component. The first and second components are different. The method also includes calculating a first Health Index and a second Health Index from the first and second measurements, respectively. The first and second Health Indices are on a comparable scale. The method also includes monitoring at least one of the first and second Health Indices relative to a predetermined Health Index threshold. The predetermined Health Index threshold is a first predetermined Health Index threshold and the method also includes monitoring the at least one of the first and second Health Indices relative to a second predetermined Health Index threshold different from the first predetermined Health Index threshold. The method also includes altering an operation of one or more of the components such that the Health Index of one or both of them reaches the threshold at a same time, or at a different time.

Still further embodiments of the present disclosure are directed to a method for predicting a health of a component of an oil rig including classifying the component and calculating a Health Index for the component. The Health Index includes an initial Health index value. The method also entails identifying conditions for operation of the component, and accessing a database of Health Index information pertaining to components similarly classified. The method can continue by identifying a time at which the Health Index for the component will reach a predetermined threshold according to the Health Index information and the initial Health Index value.

DETAILED DESCRIPTION

Figure 1:
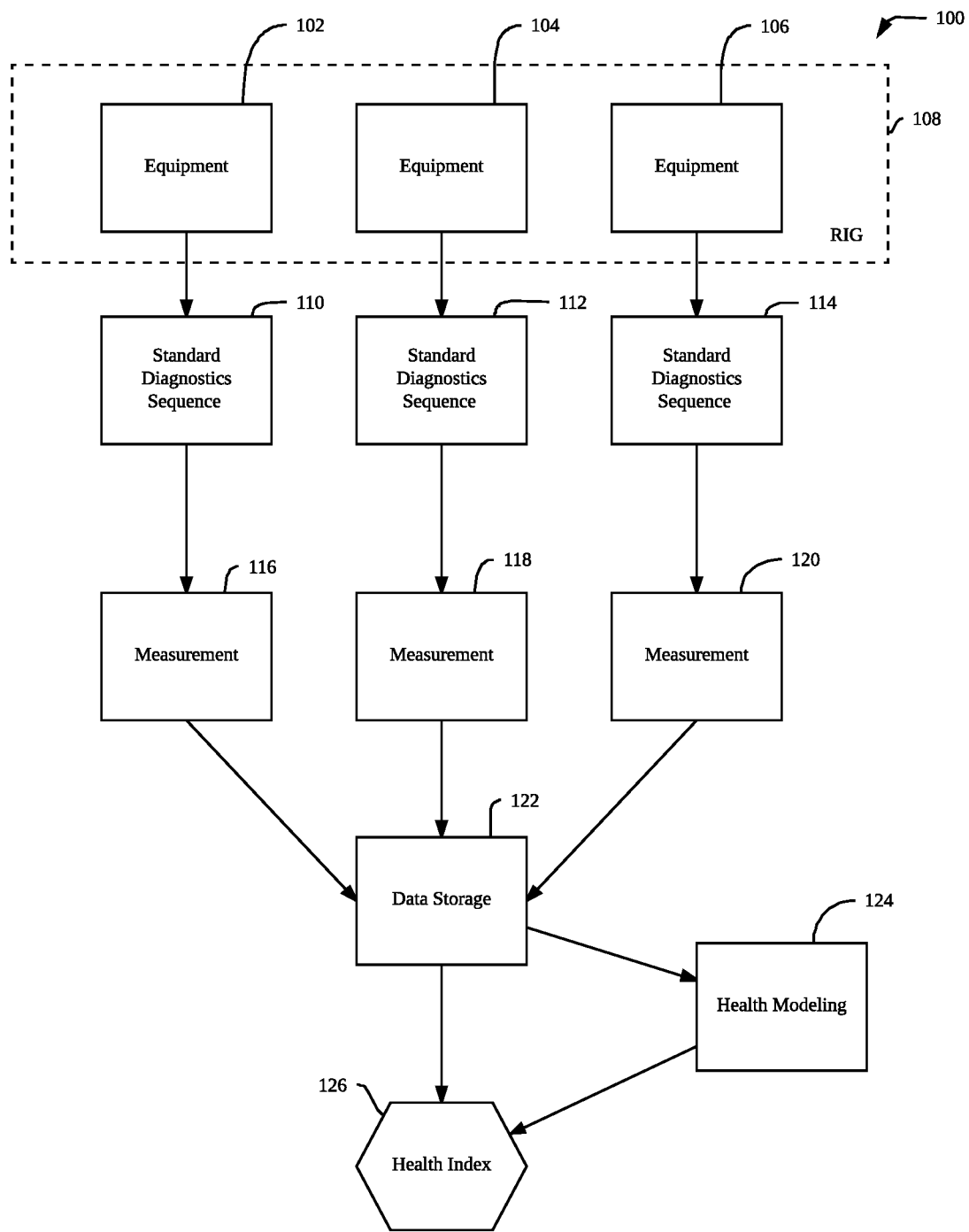
FIG. 1 illustrates a schematic block diagram of several components of a self-diagnostic rig system according to embodiments of the present disclosure.

Rig systems and methods for self-diagnostics are described herein below with reference to the attached figures. It is to be appreciated that many details are given to illustrate and highlight various features of the present invention, while some other features are described with less emphasis without detracting from the spirit of the present disclosure. FIG. 1 illustrates a schematic block diagram of several components of a self-diagnostic rig system 100 according to embodiments of the present disclosure. The system 100 includes several pieces of equipment 102, 104, and 106 which can be part of a drilling rig 108. There are three pieces of equipment shown, but the present disclosure can include any number of pieces of equipment. The pieces of equipment 102, 104, and 106 can be virtually any component used by the drilling rig 108, including drilling equipment, sensors, suspension systems, mud logging equipment, transportation systems, mud pumps, top drives, hydraulic power units, draw works, pipe handlers, walking systems, mast raising systems, power generators, motors, cooling units, lubrication systems, shakers, degassers, communication systems, rig control systems, or any other suitable piece of equipment. The equipment can also include components not typically considered part of the rig, but that operate alongside the rig, such as communications components or transportation equipment. For this reason the rig 108 is shown with a dashed line to illustrate that the equipment can be any arbitrarily assigned group of equipment. Details of the individual pieces of equipment are not given in this disclosure because the systems and methods shown and described herein are applicable to such a huge variety of equipment that these details are omitted for the sake of brevity and without altering the ability of a person of ordinary skill in the art to make and use the disclosed subject matter without undue experimentation.

The system 100 also includes a standard diagnostics sequences 110, 112, and 114. As shown, each sequence can pertain to an individual piece of equipment 102, 104, and 106 as necessary. The standard diagnostics sequence (also referred to herein as "sequences") can be a specific stand-alone activity performed to capture health data for the equipment, or it can be a part of a normal operation for the given equipment. For example, if the equipment 102 is a drill, the standard diagnostic sequence 110 pertaining to the drill can be to measure wear on the drill. This can be achieved using a sensor that operates during down-time to measure the wear, or it can be a sensor or other measurement tool which is capable of monitoring the wear on the drill during an actual operation. The sequences can be carried out on command, or can be initiated at predetermined times and positions within the normal routine workflow of the equipment, such as at start up or shut down, etc. The sequences can be operations steps that mimic a real function operation, functional steps that mimic factory tests, steps that determine equipment health, including idle tests, full load tests, and full deviation tests. The sequences can be part of a normal operation itself, with no extra sequences added. The measurements can be taken during regular activities. The sequences can be performed at any point of the lifecycle of the equipment, including without limitation engineering design and qualification, factory testing, rig commissioning, rig operations, maintenance, troubleshooting, or disposal. The sequences can also be steps that check sensor calibration or that check safety aspects of the rig 108 or subcomponents thereof. There can be multiple sequences which operate together with different objectives to be carried out on each piece of equipment. For example, suppose the equipment 104 were a crane and the standard diagnostic sequence 112 included multiple measurements taken from multiple sensors to determine the status of the crane to identify the health of the crane. Such measurements could include the quality and quantity of lubricating oil on the crane, the quality and presence of hydraulic fluid used to operate the crane (assuming the crane operates hydraulically), the position of the arm of the crane, etc.

Measurements 116, 118, and 120 can be a result of the standard diagnostics sequences 110, 112, and 114, respectively. There could be any number of measurements which together are taken to assess the status of the crane. Different pieces of equipment will naturally tend to have different aspects to monitor. The measurement data can be gathered before, during, and after the diagnostic sequences 110, 112, and 114. This data can be gathered from sensors and instruments located at the primary piece of equipment, or at a component controlled by the equipment, or at a secondary component that is affected by the piece of equipment.

The system 100 also includes a data storage component 122 which receives measurement data from the various pieces of equipment via the sequences 110, 112, and 114. The data storage component 122 can be local to the rig, such as a computer or mainframe for the rig, or it can be a central repository such as a server located remotely from the rig (or rigs). The data storage component 122 can take action immediately upon receiving the measurement data, or it can store the data for a later time. The data storage component 122 can also transmit the data elsewhere to another computing or communications facility for immediate or delayed implementation. The data storage component 122 can be part of a standard personal computer (PC), or a controller, or another electronic component configured to store data. In some embodiments the data storage component 122 is a manual log or some combination of manual/analog data storage and an electronic data storage component.

The system 100 includes a health modeling component 124 that receives data from the data storage component 122 and includes a mathematical formulation or algorithm used to convert the measurement data received into a standardized Health Index 126. The Health Index 126 can be a number on a spectrum, such as 1-100, where a given Health Index may be any number between 1 and 100. Other mathematical equivalents are also possible, such as a number between 0 and 1. In any case the Health Index 126 is a number which denotes the health of the equipment to which it pertains. The Health Index 126 of two different components may be on a different scale, for example one can be between 0 and 1 and another between 1 and 100. In some embodiments, the two different Health Indices are on a comparable scale to allow a rig operator or other decision maker to make a meaningful comparison between the two Health Indices. For purposes of clarity, the Health Index 126 is described herein as being a number between 1 and 100. When brand new, a piece of equipment may have a Health Index of 100, and when the equipment is fully depleted, consumed, or broken, the Health Index can be 0. The Health Index can be based on a single input, such as a dimensional measurement, or can include multiple measurements, such as a dimensional measurement and a surface quality measurement. For example, if the equipment in question were a drill bit, perhaps a dimensional measurement can be taken to show how much of the bit has been eroded. A surface measurement can also be taken to factor into the health model 124 which derives the Health Index 126. The inputs to the health modeling component 124 can included direct measurements such as sensor data, or they can be parameters derived by the health modeling 124, such as a computation of power from current and voltage. The Health Index 126 can represent an aggregate Health Index 126 which is formed from a combination of sub-health indices combined according to a mathematical model to arrive at the aggregate Health Index 126. The Health Index 126 gives an approximation of the equipment health condition. It can be interpreted as the probability or risk the equipment will fail to perform its function. The Health Index is also therefore a performance index, or a capability index or a capacity index. Different components may deteriorate in different ways and for some, health is the more appropriate description while in others, it is performance or capacity or capability or another suitable descriptor. For purposes of clarity and brevity the term Health Index is used uniformly herein. Running the rig equipment with a higher Health Index, therefore, represents a scenario where failure is less likely. Each rig system or sub-system can have an independent Health Index. The rig 108 can have a hierarchy of Health Indices that can be used individually or aggregated as desired. Virtually any factor can be considered by the health modeling component 124, including time expired, idle time, up-time, down-time, environment, corrosion, size, weight, manufacturer, operator, history, and previous jobs just to name a few. There are other factors which can be considered to achieve the Health Index 126.

Figure 2:
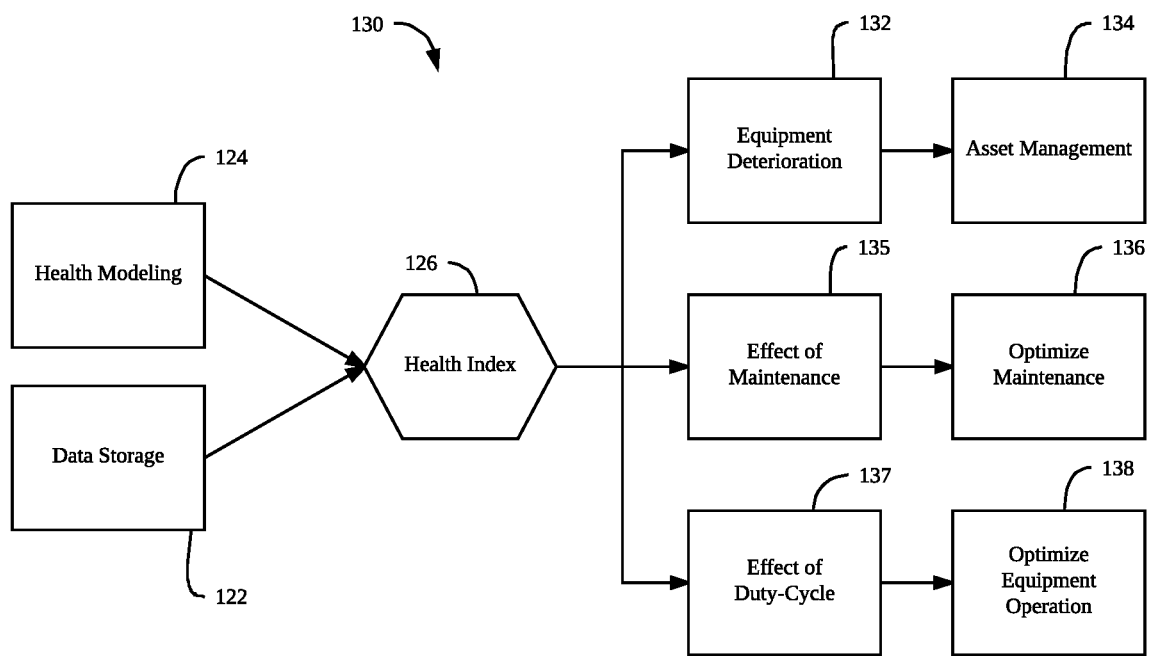
FIG. 2 shows a schematic block diagram of a system operating at different times in the lifecycle of a given piece of equipment.

FIG. 2 shows a schematic block diagram of a system 130 operating at different times in the lifecycle of a given piece of equipment. In each case, the self-diagnostic systems of the present disclosure can be used in different ways. The system 130 includes a health modeling component 124 and a data storage component 122, from which the Health Index 126 is obtained, similar to what was shown and described with respect to FIG. 1. The Health Index 126 can be used to manage equipment deterioration 132, for example by monitoring rates of deterioration for a given component. Monitoring equipment deterioration 132 can inform asset management 134, which can include maintenance scheduling, equipment replacement, equipment redundancies, etc. Another use of the Health Index 126 is with the Effect of Maintenance 135, which leads to a more fully informed and optimized maintenance 136. The Effect of Maintenance 135 can be measured using the same measurement sensors and techniques from which the Health Index 126 is calculated in the first place. Simply calculating the Health Index 126 before and after the maintenance gives a standard, numerical value that denotes the improvement achieved by the maintenance. Yet another application is the Effect of Duty-Cycle 137 and how it allows Optimal Equipment Operation 138. Suppose there are two components for which the Health Indices are expected to decay at different rates. Using the Health Index 126 and an expected value for the anticipated rate of deterioration, the components can be chosen such that they both reach a certain depleted Health Index threshold at approximately the same time or substantially the same time. It is to be appreciated by a person of ordinary skill in the art that the "same time" may have different meanings for different applications. For example, the "same time" may mean the same rig excursion, it may mean the same day, the same hour, the same minute, or the same month. There is sufficient variability in the time between two events, but it is appreciated that coordinating two Health Indices to arrive at the same threshold at the same time can have different meanings depending on the operation of the rig and the equipment in question. The two component can be replaced at the same time, preserving rig up time. In another example, there may be two components which are at least partially redundant, and which having at least one of them up at all times is more beneficial. The expected Health Indices can be staggered to avoid a time in which both components need maintenance or replacement at the same time.

Figure 3:
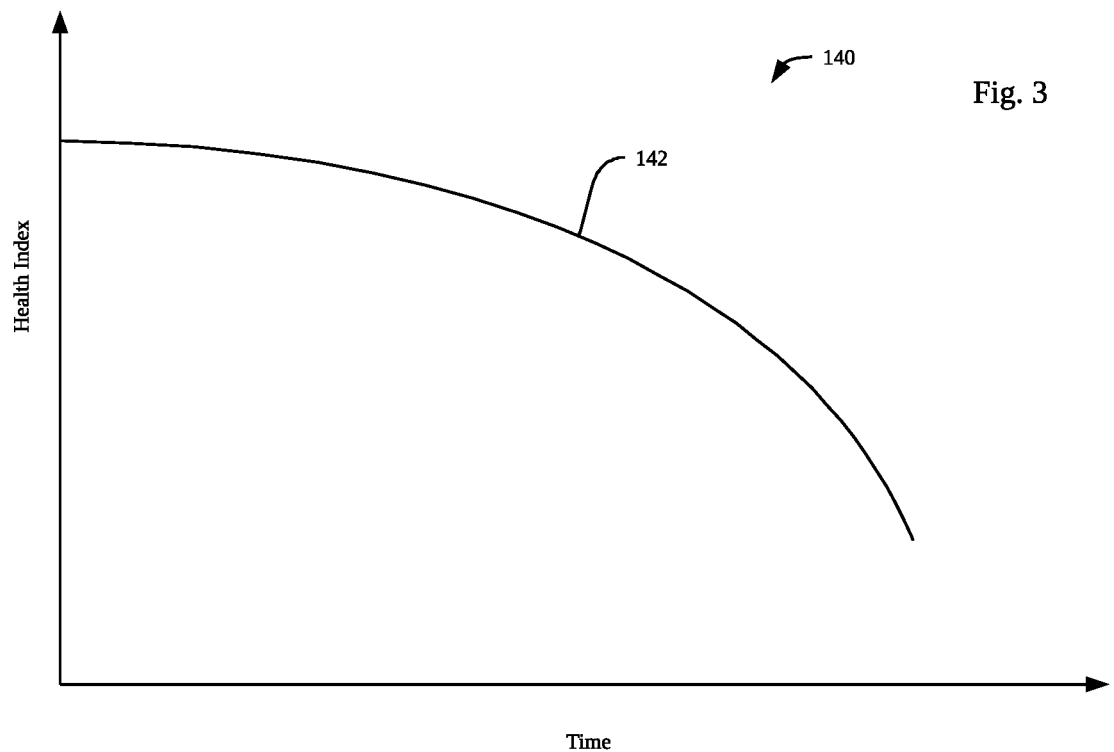
FIG. 3 is a graph of a Health Index plot against time for a given piece of equipment according to embodiments of the present disclosure.

FIG. 3 is a graph 140 of a Health Index plot 142 against time for a given piece of equipment according to embodiments of the present disclosure. The Health Index is at its highest value at an arbitrary time of zero, representing when the equipment is first installed, deployed, or otherwise initiated. The Health Index plot 142 slowly deteriorates as time progresses. In general, most equipment shows an accelerating decline in Health Index, but this is not always the case. Many different pieces of equipment may have vastly different Health Index curves. Once the Health Index reaches a sufficiently low value, the equipment can be decommissioned, repaired, updated, or otherwise addressed. The systems and methods of the present disclosure provide an ability to monitor many types of equipment in an automated manner which enables better decisions to be taken regarding the equipment in question. The accuracy of the Health Index plot 142 depends upon the accuracy of the measurement and self-diagnostic sequences used to obtain the Health Index plot 142. However, with confidence in the underlying measurement and calculations, a rig operator can make much better decisions about the status of the equipment and the rig generally than he or she would otherwise have been able to achieve.

Figure 4:
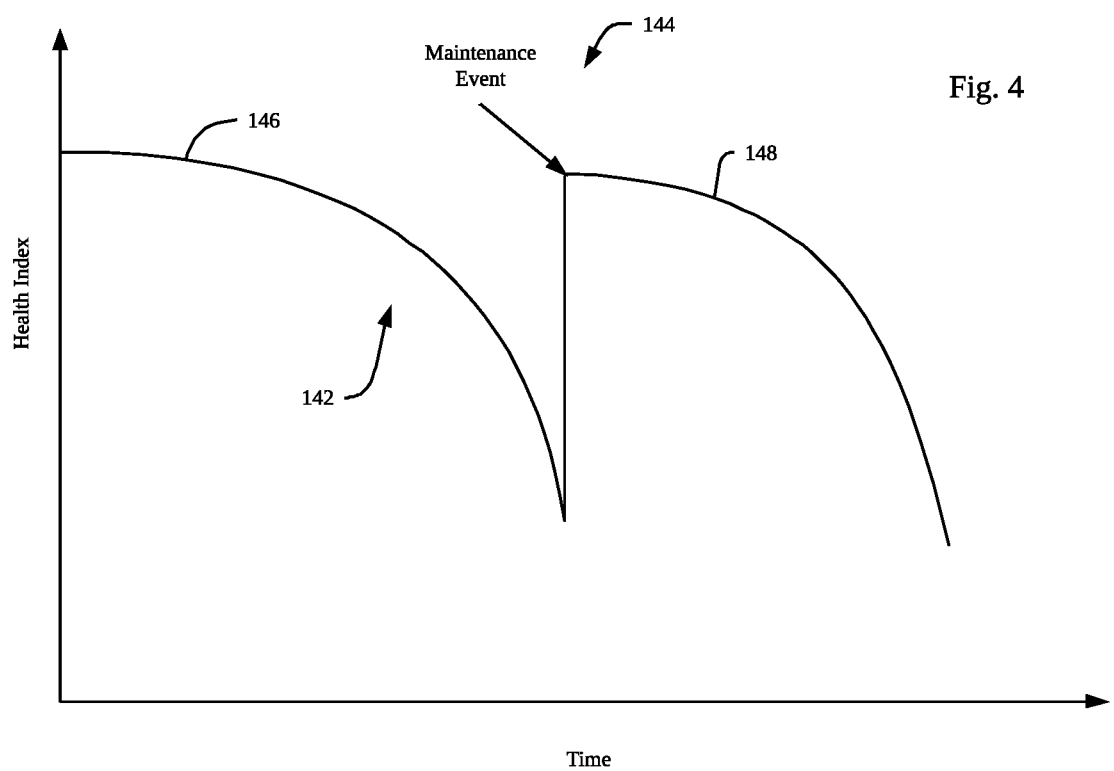
FIG. 4 is an illustration of the effect of maintenance on a Health Index plot according to embodiments of the present disclosure.

FIG. 4 is an illustration 144 of the effect of maintenance on a Health Index plot 142 according to embodiments of the present disclosure. The Health Index plot 142 has a first region 146, and a second region 148, separated by a Maintenance Event. The result of the Maintenance Event in this embodiment is an immediate, marked improvement in the Health Index, followed by a similar decay as time continues on. An example of maintenance that can be performed is replacing certain parts in a machine, refueling the machine, replacing lubrication fluids, etc. The numerical, standardized Health Index plot 142 allows the relationship between maintenance and Health Index to be monitored and measured. On a rig, where there are multiple components which decay at different rates and in difference circumstances, having a normalized Health Index provides an operator the opportunity to take preventive action based on a numerical indication of status. The different ways in which different pieces of equipment decay are factored out of the Health Index, which can represent the health of the equipment in a standardized manner.

Figure 5:
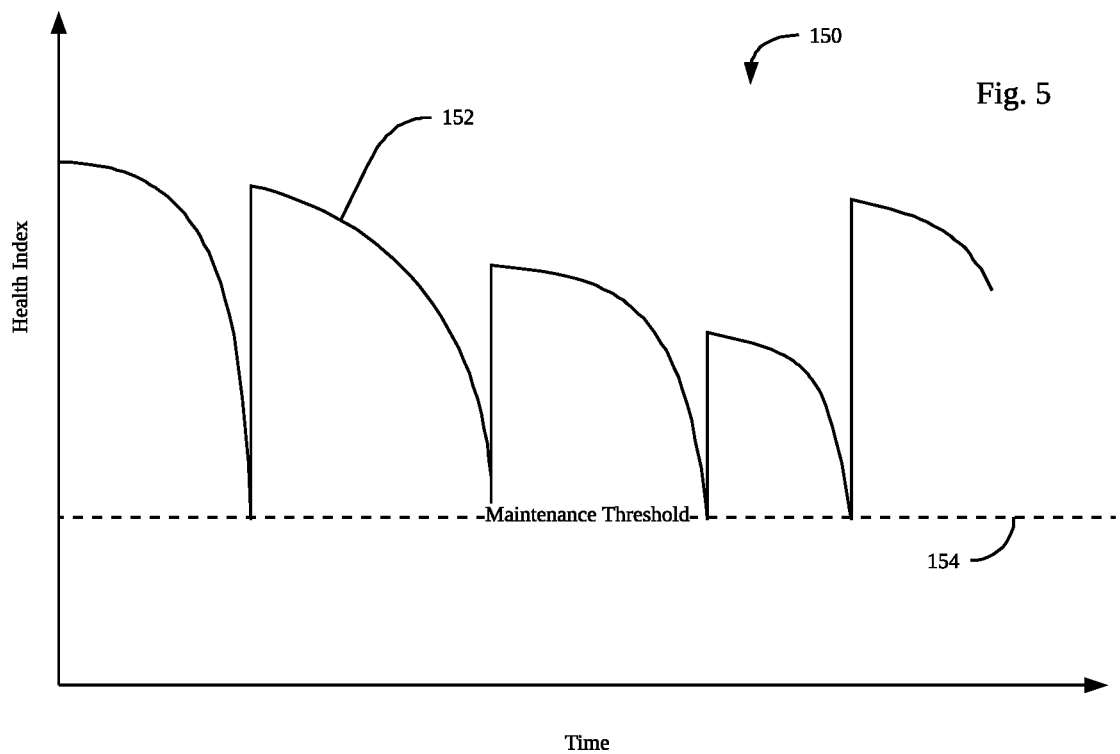
FIG. 5 is another graph showing another Health Index plot against time and includes a maintenance threshold according to embodiments of the present disclosure.

FIG. 5 is another graph 150 showing another Health Index plot 152 against time and includes a maintenance threshold 154 according to embodiments of the present disclosure. For a given piece of equipment, there may be a threshold below which the equipment should not be operated. The maintenance threshold 154 can vary according to the needs and environment of a given piece of equipment or operation. The maintenance threshold 154 can have different levels of severity, such as mandatory, suggested, recommended, etc. This allows a rig operator to identify potential issues with the equipment before a failure occurs.

Figure 6:
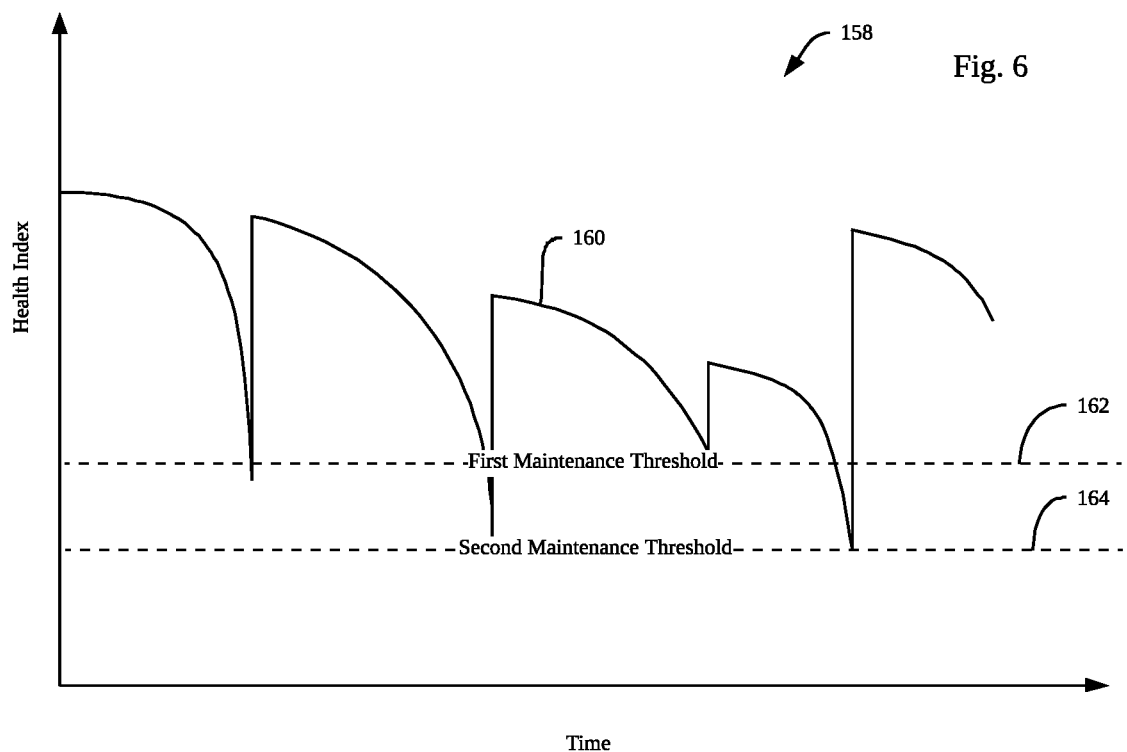
FIG. 6 is yet another graph showing a Health Index plot, a first maintenance threshold and a second maintenance threshold according to embodiments of the present disclosure.

FIG. 6 is yet another graph 158 showing a Health Index plot 160, a first maintenance threshold 162 and a second maintenance threshold 164 according to embodiments of the present disclosure. The different maintenance thresholds 162, 164, can be associated with different actions. In some embodiments, the lowest threshold indicates that all work should cease immediately because the equipment is unfit to continue. There can be virtually any number of thresholds, each being associated with a different recommended, suggested, or required action. As shown in the graph 158, this particular equipment has been repaired four times, the first time was near the first threshold 162 and the second time was near the second threshold 164. Different equipment may have different needs upon reaching certain thresholds. There may be some equipment which is known to operate such that there is an order of thresholds to which the Health Index can be brought. For example, consider the plot 160. The equipment in question may still be usable after crossing the first maintenance threshold 162, but maintenance is alerted or scheduled or initiated. At the second maintenance threshold 164, the equipment should be stopped. In some embodiments, the first maintenance threshold 162 can trigger a reduction in load or capacity, and the second maintenance threshold 164 represents a required shut-down.

Figure 7:
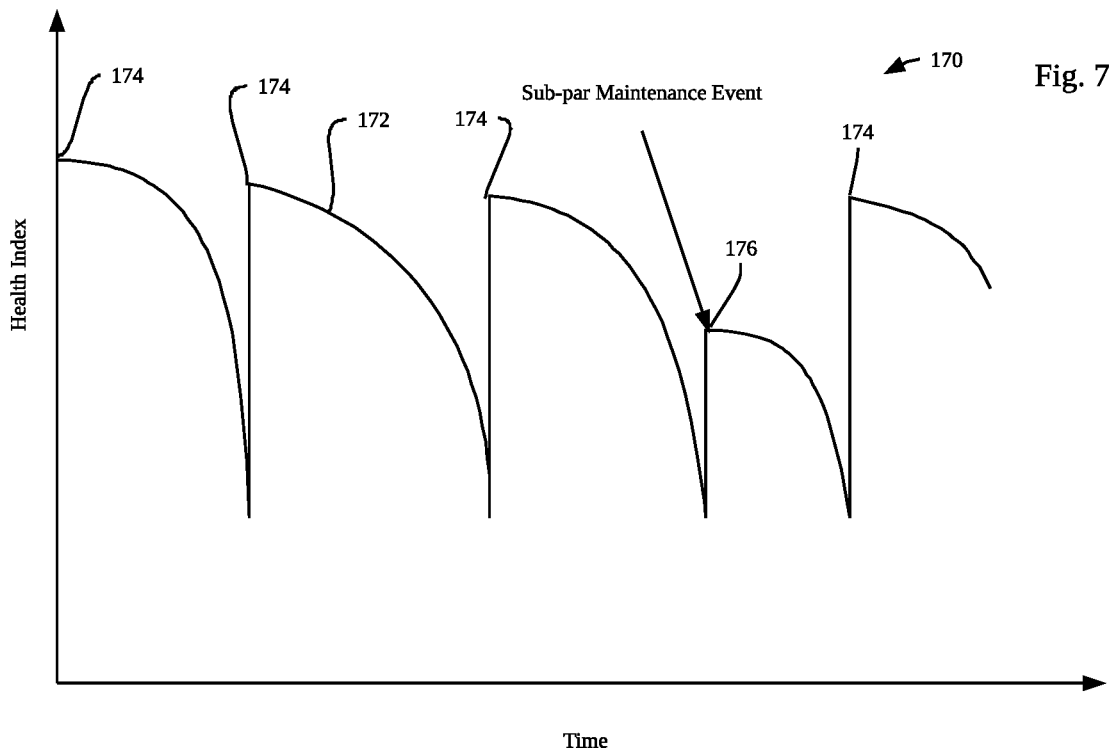
FIG. 7 is a graph of a Health Index plot showing several maintenance events according to embodiments of the present disclosure.

FIG. 7 is a graph 170 of a Health Index plot 172 showing several maintenance events according to embodiments of the present disclosure. There are several satisfactory maintenance events 174 which raise the Health Index plot 172 to approximately the same level. There is one maintenance event 176 which is measurably sub-par. The reasons for this difference can vary, but the systems and methods of the present disclosure will alert the rig operator to its existence. It is possible that the difference is expected and considered normal. For example, it is possible for each successive maintenance event to result in successively lower Health Indices, or for the slope of the Health Index plot 172 to become successively steeper because the equipment deteriorates at a faster rate each time there is maintenance performed. In each case, there may or may not be an issue worthy of attention, but the systems and methods of the present disclosure inform the operator that such a discrepancy exists or does not exist and enables a more informed decision on that basis. A progressively diminishing maintenance effectiveness can also be tracked to predict and determine a cost/benefit ratio for the maintenance. The information can be used to trigger machine overhauls.

Figure 8:
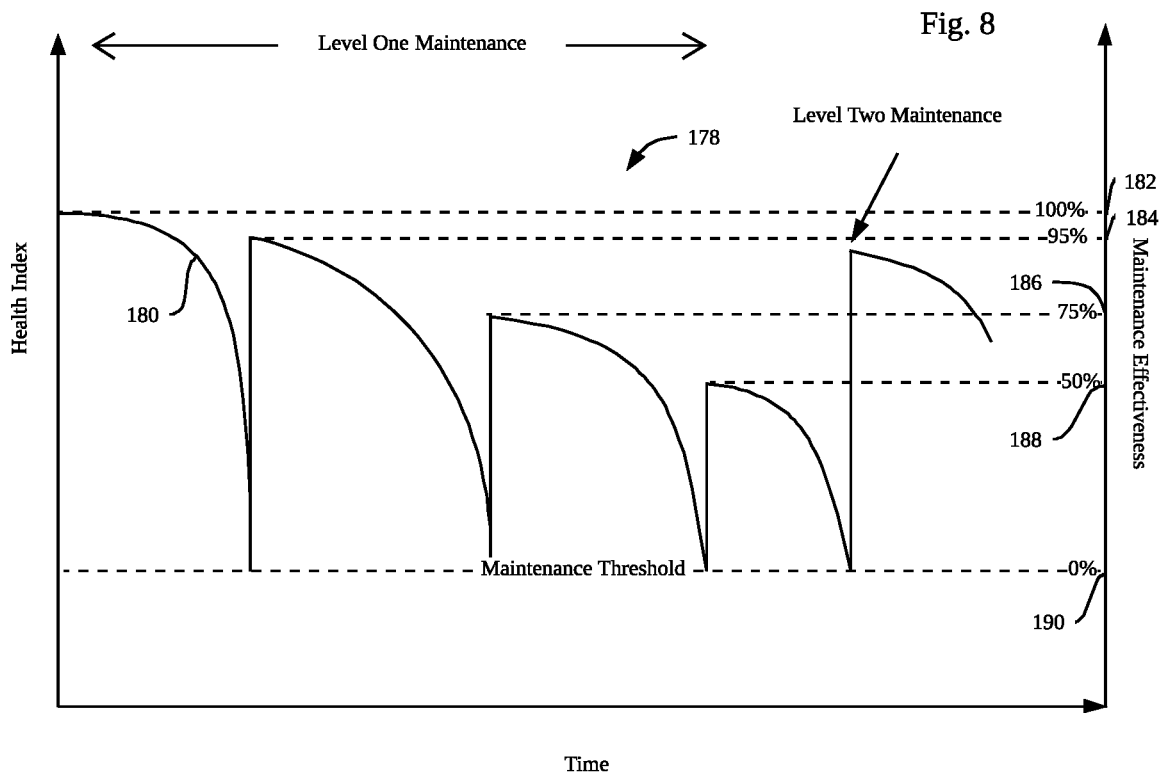
FIG. 8 is a graph of a Health Index plot showing multiple maintenance events according to embodiments of the present disclosure.

FIG. 8 is a graph of a Health Index plot 180 according to embodiments of the present disclosure. There are multiple maintenance events (182, 184, 186, and 188) shown in the graph 180, each resulting in a different percent (100, 95, 75, and 50, respectively) of maximum (or at least initial) Health Index. There may be multiple levels or types of maintenance performed which result in different increases in the resulting Health Index for each. In the plot 178 in FIG. 8, Maintenance Effectiveness can be tracked on the right side and can be given in terms of percent of the maximum (or at least initial) Health Index. The Maintenance Effectiveness can be defined as 100% when the Health Index returns to the new condition and 0% being maintenance had no effect at all after maintenance. For example, a maintenance logic can be implemented so that after maintenance level 1 is performed sequentially at the maintenance threshold 190 and, when the Maintenance Effectiveness of the last level 1 maintenance is below 50% then this triggers a level 2 maintenance to be performed the next time the Health Index reaches the maintenance threshold 190. It is possible that a given piece of equipment should be obsoleted due to the pattern of Maintenance Effect as measured according to embodiments of the present disclosure. Multiple maintenance thresholds can be established depending on the equipment—two levels are described and shown in FIG. 8 for purposes of brevity. There can be any number of thresholds and any number of maintenance levels for a given piece of equipment.

Establishing a maintenance threshold which is specific to several different rig components, can also be used to strategically align and optimize multiple equipment maintenance to happen concurrently or sequentially as needed. This can be achieved by increasing or decreasing equipment usage such that its deterioration accelerates or decelerates to match other equipment maintenance points. For example, suppose there are two pumps in a rig system which operate on the same fluid line. The first pump has a higher Health Index than the second pump, so the operator can choose to use the first pump at a higher rate or under heavier loads than the second pump. The difference in usage can be solved for using the health modeling component described with respect to FIG. 1 by setting the time at which each pump's Health Index reaches a predetermined threshold equal. The difference between the two pump loads can be updated periodically and the Health Indices can be evaluated periodically to assure that both pumps reach the maintenance threshold at the same time so that they can be repaired at the same time. In other applications the equipment may need to be maintained at different times so the calculus has a different threshold in mind, but the principle is similar. In this case, consider two pumps which are redundant for safety. If both pumps required maintenance at the same time, the greater system may experience costly downtime. The use of the two pumps can be adjusted such that one pump will require and benefit from maintenance at a different time than the other pump so that at any given time there is at least one pump online. Other interactions between pieces of equipment are possible using the systems and methods of the present disclosure.

Figure 9:
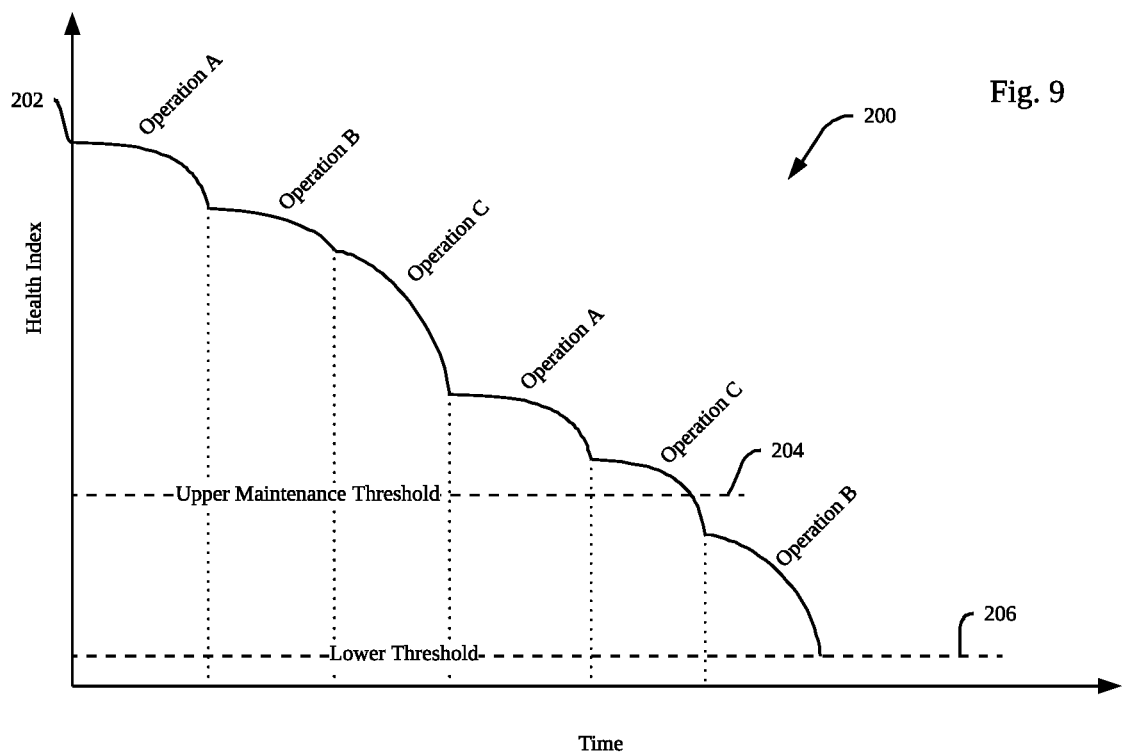
FIG. 9 is a graph of a Health Index plot using multiple operations according to embodiments of the present disclosure.

Another potential application for the systems and methods of the present disclosure is the ability to predict how certain activities, actions, jobs etc. for the equipment will affect the Health Index of the equipment. FIG. 9 is a graph 200 of a Health Index plot 202 according to embodiments of the present disclosure. Operations A, B, and C are planned for a certain piece of equipment, and the measured Health Index curve for each is known from past experience. An operator can plan a job based on the expected reduction in Health Index for each operation and plot the expected toll the total job will take on the equipment. In the plot 202 shown, the job includes six operations to be performed in the order shown: A, B, C, A, C, B. The plot 202 shows how each operation will affect the overall Health Index of the system. There can be an upper threshold 204 and a lower threshold 206 and perhaps other thresholds which can inform a rig operator of how the A B C A C D job will impact the Health Index. As shown in FIG. 9, the upper threshold 204 will be crossed somewhere during the second Operation C, and that at the end of the second Operation B the lower threshold 206 will be reached. The operator has much more information using this system than otherwise would be available, leading to a more efficient plan for the job.

Figure 10:
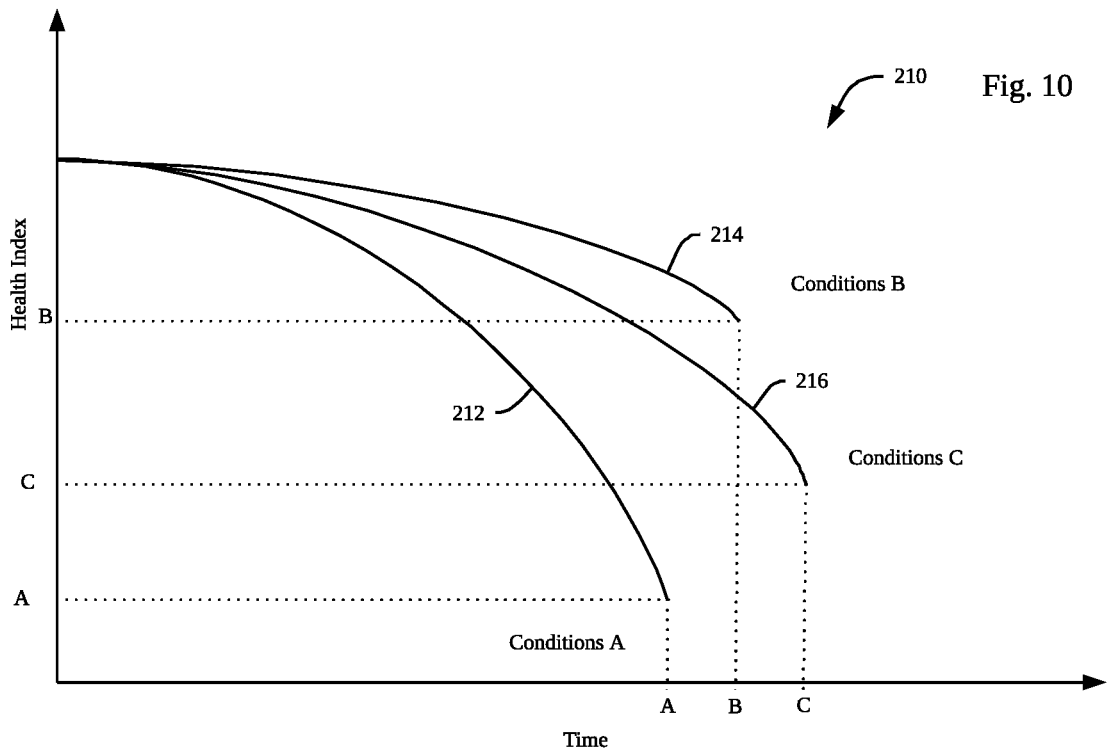
FIG. 10 is a graph of three plots representing three conditions under which the equipment will operate according to embodiments of the present disclosure.

FIG. 10 is a graph 210 of three plots representing three conditions under which the equipment will operate according to embodiments of the present disclosure. The first plot 212 represents Conditions A, the second plot 214 represents Conditions B, and the third plot 216 represents Conditions C. It appears that Conditions B are the best of the three in terms of maximizing Health Index, followed in order by Conditions C and Conditions A. It is to be understood that there may be more conditions under which the equipment will operate. Indeed, virtually any number of conditions are possible. Some examples of the conditions which may vary is temperature, altitude, pH of the soil, viscosity of the drilling mud, etc. Each of these variables can be calculated with the Health Index and has an effect on the Health Index, either to prolong or shorten the expected life of the equipment. In some embodiments, this information is gathered empirically using past experiences with equipment operating under these conditions and can be stored in a data storage component and used to predict future Health Indices. The expected model of Health Index for a given condition can be updated as more data is available from each job the rig performs. Over time the data becomes more and more accurate and yields an ever-improving view of how equipment will perform over time. This information can be used to compare how a given operation impacts the Health Index by measuring the Health Index before and after the job. Conditions also include varying running parameters, such as speed. For several reasons, the operator might decide running the equipment at higher speed (Condition A, finished faster) at the expense of causing more deterioration. With this information the operator can make the decision with improved knowledge. Alternatively the operator might not be in a rush and could run the equipment slower (Condition C), finish later but conserve life.

Figure 11:
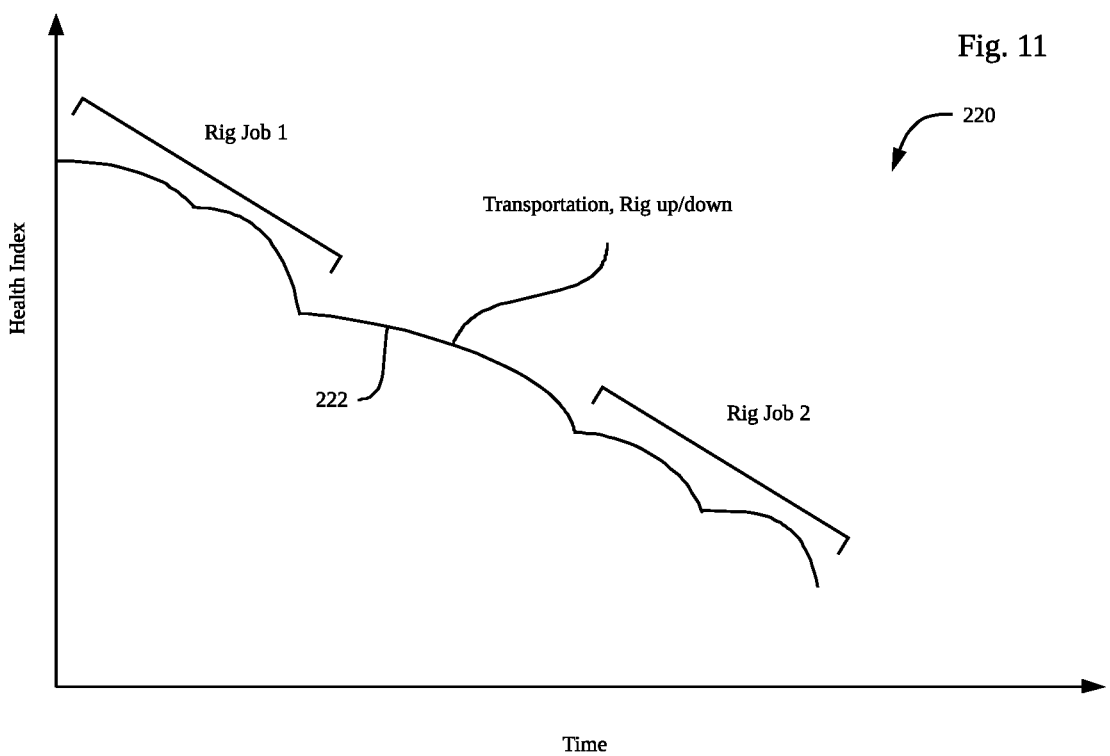
FIG. 11 is a graph of a Health Index plot showing the impact of life-cycle events according to embodiments of the present disclosure

Systems and methods of the present disclosure are also useful for determining the effect of certain life-cycle events can impact the Health Index. FIG. 11 is a graph 220 of a Health Index plot 222 according to embodiments of the present disclosure. Certain life-cycle events are not well-suited for measurements to be taken. Examples include transportation, rig-up and rig-down times, and other activities when the measurements may not be available. In FIG. 11, there is a first rig job, followed by a transportation time, then a second rig job. The Health Index before and after the transportation time can be measured and tracked to help identify the effects of the transportation time on the equipment. In some embodiments the some or all of the measurements are available during the transportation time in which case the curve of the Health Index can be achieved by taking multiple measurements, calculating the Health Index for each data point, and plotting out the curve. In other embodiments, the measurements may be limited or altogether unavailable during such time, in which case the end points of the Health Index plot 222 are known for the transportation time, but no other intermediate data is available. Even with only the end points, the gross effect on the Health Index can be known. This provides a rig operator with much more information about the health of the rig and its many components than would otherwise be available. These techniques and systems will also allow a rig operator to identify abusive behaviors which may be happening to one or more pieces of equipment in the rig. If there is a large, unexpected reduction in the Health Index during a given portion, at least the rig operator can be alerted to the fact and can begin an inquiry into the activity. In some cases it may be costly to take measurements so frequently during such time as a transportation or rig-up or rig-down event. If there is little appreciable effect on the Health Index, it may not be cost-effective to take the measurements during the down time. In any case, the rig operator has information in a standardized format which will help make informed decisions about the health of the rig.

Some aspects of the present disclosure allow for isolation or aggregation of Health Indices as needed. In some cases it may become valuable to know the effect on certain subsystems with or without influence from other components. In some embodiments, the Health Index can be used to compare performance of different equipment from different providers, different generations, or with different technology improvements.

Figure 12:
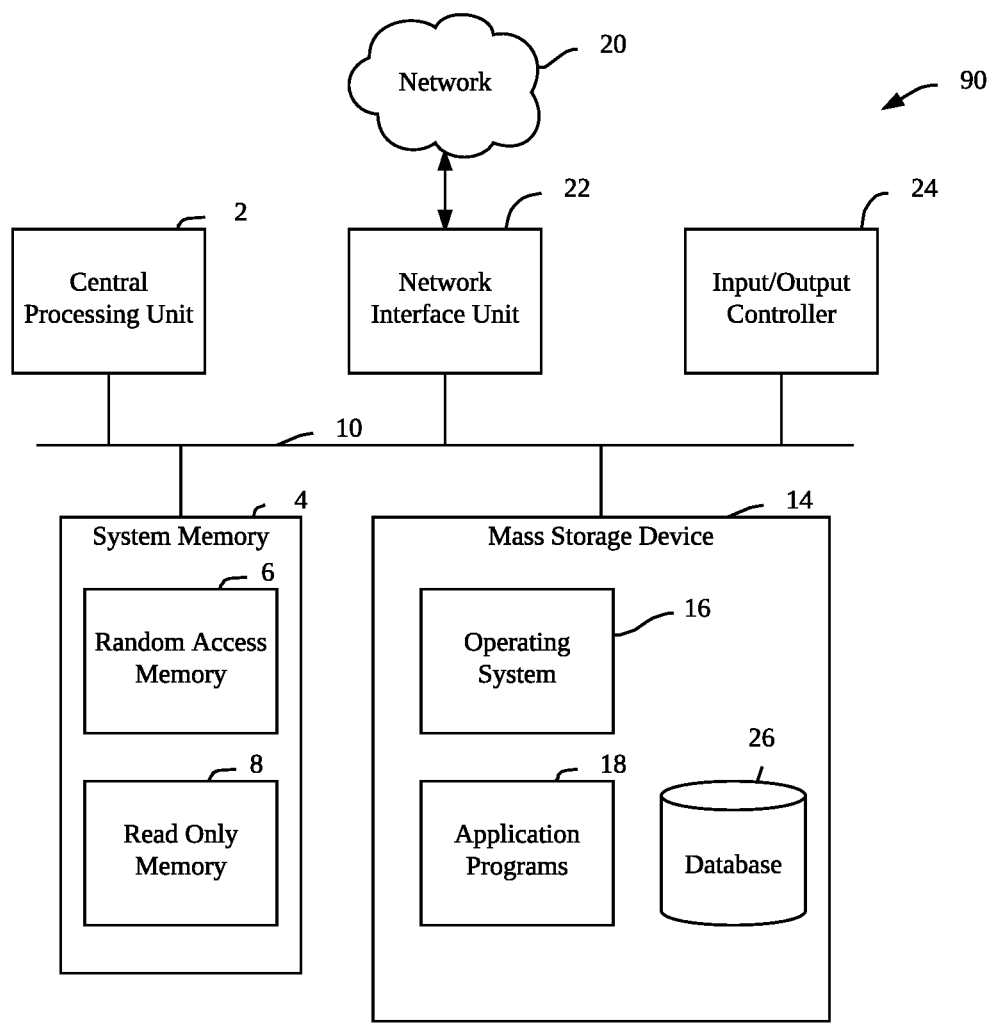
FIG. 12 is a block diagram of an operating environment for implementations of computer-implemented methods according to embodiments of the present disclosure.

FIG. 12 and the corresponding discussion are intended to provide a brief, general description of a suitable computing environment in which embodiments may be implemented. Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 12, an illustrative computer architecture for a computer 90 utilized in the various embodiments will be described. The computer architecture shown in FIG. 12 may be configured as a desktop or mobile computer and includes a central processing unit 2 ("CPU"), a system memory 4, including a random access memory 6 ("RAM") and a read-only memory ("ROM") 8, and a system bus 10 that couples the memory to the CPU 2.

A basic input/output system containing the basic routines that help to transfer information between elements within the computer, such as during startup, is stored in the ROM 8. The computer 90 further includes a mass storage device 14 for storing an operating system 16, application programs 18, and other program modules, which will be described in greater detail below.

The mass storage device 14 is connected to the CPU 2 through a mass storage controller (not shown) connected to the bus 10. The mass storage device 14 and its associated computer-readable media provide non-volatile storage for the computer 90. Although the description of computer-readable media contained herein refers to a mass storage device, such as a hard disk or CD-ROM drive, the computer-readable media can be any available media that can be accessed by the computer 90. The mass storage device 14 can also contain one or more databases 26.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 90.

According to various embodiments, computer 90 may operate in a networked environment using logical connections to remote computers through a network 20, such as the Internet. The computer 90 may connect to the network 20 through a network interface unit 22 connected to the bus 10. The network connection may be wireless and/or wired. The network interface unit 22 may also be utilized to connect to other types of networks and remote computer systems. The computer 90 may also include an input/output controller 24 for receiving and processing input from a number of other devices, including a keyboard, mouse, or electronic stylus (not shown in FIG. 1). Similarly, an input/output controller 24 may provide output to a display screen, a printer, or other type of output device (not shown).

As mentioned briefly above, a number of program modules and data files may be stored in the mass storage device 14 and RAM 6 of the computer 90, including an operating system 16 suitable for controlling the operation of a networked personal computer. The mass storage device 14 and RAM 6 may also store one or more program modules. In particular, the mass storage device 14 and the RAM 6 may store one or more application programs 18.

The systems and methods described herein are given to highlight certain aspects of the present disclosure and are not to be interpreted as limiting the scope of the disclosure. It is to be appreciated that aspects of the present disclosure are given to illustrate possible applications for the systems and methods of the present disclosure, while some details are more prominently described than others in an effort to instruct a person of ordinary skill in the art how to make and use the systems and methods herein without undue experimentation or difficulty.

The invention claimed is:

1. A system for deriving a numerical Health Index for one or more components, the system comprising:
   a first component having a first feature which decays when the first component is operated, wherein the first component comprises part of a drilling rig;
   a second component having a second feature which decays when the second component is operated, wherein the second component comprises another part of the drilling rig, and wherein the second component is different from the first component;
   a measurement sensor operably coupled to the first component and the second component and configured to measure a first decay of the first feature and a second decay of the second feature; and
   a health model configured to receive a measurement from the measurement sensor, wherein the measurement represents the first decay and the second decay, the health model being configured to compute a first Health Index corresponding to the first component and a second Health Index corresponding to the second component, wherein the first and second Health Indices are on a same scale,
   wherein the system is configured to alter operation of the first and second components to cause the first and second Health Indices to reach a threshold at a same time, wherein an operation of the drilling rig is stopped to perform maintenance on the first and second components when the first and second Health Indices to reach the threshold, and wherein performing the maintenance on the first and second components at the same time reduces an amount of time that the operation of the drilling rig is stopped.

2. The system of claim 1 wherein the measurement sensor is configured to measure the first decay using a direct measurement and the second decay using an indirect measurement.

3. The system of claim 1 wherein the measurement sensor is configured to execute one or more self-diagnostic routine sequences.

4. The system of claim 3 wherein the one or more self-diagnostic routine sequences comprise part of the operation for at least one of the first and second components.

5. The system of claim 1 wherein the scale is a numerical scale.

6. The system of claim 1, further comprising a data storage configured to receive and store information pertaining to the first and second Health Indices.

7. The system of claim 1 wherein the first or second component comprises at least one of a mud pump, a top drive, a hydraulic power unit, a draw works, a pipe handler, a walking system, a mast raising system, a power generator, a motor, a cooling unit, a lubrication system, a shaker, a degasser, a communication system, or a rig control system.

8. The system of claim 1, further comprising an alarm configured to activate if the first Health Index, the second Health Index, or both reaches the threshold.

9. The system of claim 1 wherein the first component comprises an aggregation of multiple subcomponents.

10. The system of claim 1, wherein each successive maintenance that is performed on the first component results in the first Health Index being raised to successively lower values.

11. The system of claim 10, further comprising replacing the first component when the maintenance that is performed on the first component results in the first Health Index not being raised to a predetermined value.

12. The system of claim 10, wherein a second level of maintenance is performed on the first component when a previous round of maintenance that is performed on the first component results in the first Health Index not being raised to a predetermined value.

13. The system of claim 12, wherein the second level of maintenance raises the first Health Index to above the predetermined value.

14. A method of monitoring a health of one or more components, the method comprising:
   taking a first measurement of a feature of a first component, wherein the first component comprises part of a drilling rig;
   taking a second measurement of a feature of a second component, wherein the second component comprises another part of the drilling rig, and wherein the first and second components are different;
   calculating a first Health Index and a second Health Index from the first and second measurements, respectively, wherein the first and second Health Indices are on a same scale;
   monitoring at least one of the first and second Health Indices relative to a predetermined Health Index threshold; and
   altering operation of the first and second components to cause the first and second Health Indices to reach the predetermined Health Index threshold at a same time, wherein an operation of the drilling rig is stopped to perform maintenance on the first and second components when the first and second Health Indices reach the predetermined Health Index threshold, and wherein causing the first and second Health Indices to reach the predetermined Health Index threshold at the same time reduces an amount of time that the operation of the drilling rig is stopped.

15. The method of claim 14 wherein the predetermined Health Index threshold is a first predetermined Health Index threshold, the method further comprising monitoring the at least one of the first and second Health Indices relative to a second predetermined Health Index threshold different from the first predetermined Health Index threshold.

16. The method of claim 15 wherein the first predetermined Health Index threshold has a first associated suggested action and the second predetermined Health Index threshold has a second associated suggested action different from the first associated suggested action.

17. The method of claim 16 wherein the first associated suggested action is performing the maintenance, and the second associated suggested action is shutting down the first and second components.

18. The method of claim 14, further comprising recalculating at least one of the first and second Health Indices after performing the maintenance.

19. The method of claim 18, further comprising:
   comparing at least one of the first and second Health Indices after the maintenance to itself before the maintenance; and
   calculating a numerical score representing an effect of the maintenance corresponding to a difference between the at least one of first and second Health Indices before and after the maintenance.

20. The method of claim 14, wherein altering the operation of the first and second components changes the first Health Index, the second Health Index, or both.

21. A method for predicting a health of one or more components of an oil rig, the method comprising:

calculating a first Health Index for a first component of the oil rig;

calculating a second Health Index for a second component of the oil rig;

identifying conditions for operation of the first and second components;

accessing a database of Health Index information pertaining to other components that are classified the same as the first and second components; and altering operation of the first and second components to cause the first and second Health Indices to reach a predetermined threshold at a same time according to the first and second Health Indices and the Health Index information, wherein an operation of the oil rig is stopped to perform maintenance on the first and second components when the first and second Health Indices reach the predetermined threshold, and wherein causing the first and second Health Indices to reach the predetermined threshold at the same time reduces an amount of time that the operation of the oil rig is stopped.

22. The method of claim 21, wherein the database of Health Index information includes information pertaining to the operation when the operation is carried out by the other components.

23. The method of claim 22, further comprising calculating a plot of expected Health Index progression according to the database of Health Index information.

24. The method of claim 21 further comprising:
comparing the first and second Health Indices to an expected Health Index; and
calculating a difference between the first and second Health Indices and the expected Health Index.

25. The method of claim 21, further comprising identifying a period of time for which the Health Index information is not available.

26. The method of claim 25, further comprising calculating a beginning Health Index value and an ending Health Index value for the period of time, wherein a difference between the beginning Health Index value and the ending Health Index value quantifies a Health Index deterioration for the period of time.

* * * * *